(12) United States Patent
Taylor et al.

(10) Patent No.: US 8,290,330 B2
(45) Date of Patent: Oct. 16, 2012

(54) PATCH PANEL ASSEMBLY

(75) Inventors: Chris Taylor, Cheltenham Glos (GB); Stephen John Hough, Tewkesbury Gloucestershire (GB); Alastair Hoath, Cheltenham Gloucestershire (GB)

(73) Assignee: ADC GmbH (DE)

( * ) Notice: Subject to any disclaimer, the term of this patent is extended or adjusted under 35 U.S.C. 154(b) by 0 days.

(21) Appl. No.: 12/547,791

(22) Filed: Aug. 26, 2009

(65) Prior Publication Data

US 2010/0080512 A1    Apr. 1, 2010

Related U.S. Application Data

(60) Provisional application No. 61/094,752, filed on Sep. 5, 2008, provisional application No. 61/095,086, filed on Sep. 8, 2008.

(51) Int. Cl.
*G02B 6/00* (2006.01)

(52) U.S. Cl. .......................................... 385/135; 385/134

(58) Field of Classification Search .......................... None
See application file for complete search history.

(56) References Cited

U.S. PATENT DOCUMENTS

| | | | |
|---|---|---|---|
| 5,071,211 A | 12/1991 | Debortoli et al. | |
| 5,129,030 A * | 7/1992 | Petrunia | 385/135 |
| 5,149,026 A * | 9/1992 | Allen | 248/68.1 |
| 5,167,001 A | 11/1992 | Debortoli et al. | |
| 5,302,140 A | 4/1994 | Arnett | |
| 5,490,229 A | 2/1996 | Ghandeharizadeh et al. | |
| 5,566,269 A * | 10/1996 | Eberle et al. | 385/137 |
| 5,639,261 A | 6/1997 | Ruthowski et al. | |
| 5,727,797 A * | 3/1998 | Bowles | 280/14.21 |
| 5,825,962 A * | 10/1998 | Walters et al. | 385/135 |
| 6,077,113 A | 6/2000 | Lecomte | |
| 6,216,320 B1 * | 4/2001 | Schauermann | 24/458 |
| 6,513,764 B2 * | 2/2003 | Koziol | 248/68.1 |
| 6,537,106 B1 | 3/2003 | Follingstad | |
| 6,678,456 B2 * | 1/2004 | Etemad-Moghadam | 385/134 |
| 6,944,389 B2 | 9/2005 | Giraud et al. | |
| 7,031,588 B2 | 4/2006 | Cowley et al. | |
| 7,077,688 B2 * | 7/2006 | Peng | 439/471 |
| 7,194,181 B2 | 3/2007 | Holmberg et al. | |
| 7,345,241 B2 | 3/2008 | Caveney et al. | |
| 7,397,996 B2 * | 7/2008 | Herzog et al. | 385/135 |
| 7,526,171 B2 * | 4/2009 | Caveney et al. | 385/135 |
| 7,570,860 B2 | 8/2009 | Smrha et al. | |
| 7,619,164 B2 | 11/2009 | Caveney et al. | |
| 7,734,139 B2 * | 6/2010 | Rector, III | 385/136 |
| 7,769,266 B2 | 8/2010 | Morris | |

(Continued)

FOREIGN PATENT DOCUMENTS

DE        94 21 696 U1        5/1996

(Continued)

OTHER PUBLICATIONS

International Search Report mailed Jan. 22, 2010; International Application No. PCT/EP2009/006351 (3 pages).

(Continued)

*Primary Examiner* — Tina Wong
(74) *Attorney, Agent, or Firm* — Merchant & Gould P.C.

(57) ABSTRACT

A patch panel assembly including a cable manager, a front panel, and a cable grip holder having adjustable holding elements for securing a cable. The front panel is pivotable between a normal position and a pivoted position.

18 Claims, 22 Drawing Sheets

U.S. PATENT DOCUMENTS

| | | |
|---|---|---|
| 2002/0170726 A1 | 11/2002 | Mendoza |
| 2004/0120681 A1* | 6/2004 | Bohle et al. .................... 385/135 |
| 2006/0018622 A1 | 1/2006 | Caveney et al. |
| 2008/0085094 A1 | 4/2008 | Krampotich |
| 2010/0078529 A1 | 4/2010 | Taylor |
| 2010/0133391 A1 | 6/2010 | Taylor |
| 2010/0166378 A1 | 7/2010 | Taylor |

FOREIGN PATENT DOCUMENTS

| | | |
|---|---|---|
| DE | 100 05 102 A1 | 8/2001 |
| DE | 100 19 452 A1 | 10/2001 |
| DE | 103 13 358 B3 | 8/2004 |
| EP | 0 743 706 A2 | 11/1996 |
| EP | 0 795 935 A2 | 9/1997 |
| EP | 0 871 047 A1 | 10/1998 |
| EP | 1 079 638 | 2/2001 |
| EP | 1 160 605 A2 | 12/2001 |
| EP | 1 280 363 A2 | 1/2003 |
| EP | 1 603 345 | 12/2005 |
| EP | 1 681 752 | 7/2006 |
| EP | 1 681 752 A | 7/2006 |
| FR | 2 758 660 A1 | 7/1998 |
| GB | 2 408 392 A | 5/2005 |
| GB | 2 436 641 | 3/2007 |
| WO | 2006/012389 | 2/2006 |
| WO | WO 2006/012389 | 2/2006 |
| WO | 2007/019973 | 2/2007 |
| WO | WO 2007/019973 A1 | 2/2007 |
| WO | 2010/025901 A3 | 3/2010 |

OTHER PUBLICATIONS

Written Opinion of the International Searching Authority; International Application No. PCT/EP2009/006351; (6 pages).

International Search Report mailed Feb. 10, 2010 (5 pages).

International Preliminary Report on Patentability mailed Mar. 8, 2011 (9 pages).

* cited by examiner

PATCH PANEL ASSEMBLY

CROSS REFERENCE TO RELATED APPLICATIONS

This application claims the benefit of provisional application Ser. No. 61/094,752, filed Sep. 5, 2008 and provisional application Ser. No. 61/095,086, filed Sep. 8, 2008, which is incorporated herein by reference in their entirety.

BACKGROUND

Patch panels are commonly used to enable inter-connection or cross-connection between telecommunications equipment. A typical patch panel includes a cable termination interface to connect one or more patch cables to respective connector elements. Additionally, patch panels include fixtures to facilitate cable management and organization.

The telecommunications industry is driven to provide patch panel systems that provide the most effective and efficient methods for cable termination and management. For these and other reasons improved patch panel assemblies are desired.

SUMMARY

In one aspect, a telecommunications patch panel assembly is provided. The telecommunications patch panel assembly includes a cable manager having a tray on one side positioned between a first end and a second end, and a front panel pivotally connected to the cable manager on a side opposite of the tray. In a preferred embodiment, the front panel is pivotable between a normal position and a pivoted position. The patch panel assembly additionally includes a cable grip holder having a base, and one or more holding elements for securing a cable. The holding elements are adjustable in shape.

In one embodiment, the holding elements include a first proximal end affixed to the base, a second distal end, and a plurality of periodically spaced teeth formed on a top surface. A tab is formed on the base extending from below the base to above the base. The cable grip holder further includes a receiving tooth formed on the tab and a passage defined through the base. The holding element is locked into place by inserting the distal end into the passage until a selected tooth engages the receiving tooth.

In a second aspect, a cable grip holder is provided. The cable grip holder includes a base, and one or more holding elements for securing a cable. The holding elements including a proximal end affixed to the base, a distal end, and a plurality of periodically spaced teeth formed on a top surface. A tab is formed on the base extending from below the base to above the base. The cable grip holder further includes a receiving tooth formed on the tab and a passage defined through the base. The holding element is locked into place by inserting open end into passage until a selected tooth engages the receiving tooth.

In a third aspect, a method of organizing and terminating a cable to a patch panel assembly is provided. The method includes pivoting a front panel from a normal position to a pivoted position relative to a cable tray, connecting one or more conductors of one or more cables to the front panel, inserting the one or more cables into one or more holding elements on the tray relative to the pivoted front panel, pivoting the front panel from the pivoted position to the normal position, and locking the holding elements to secure the one or more cables.

BRIEF DESCRIPTION OF THE DRAWINGS

Aspects of the disclosure may be more completely understood in consideration of the following detailed description of various embodiments of the disclosure in connection with the accompanying drawings, in which.

DETAILED DESCRIPTION

The following embodiments described in this document are provided by way of illustration only and should not be construed as limiting. Various modifications and changes may be made to the example embodiments described below without departing from the true spirit and scope of the disclosure.

Figure 1:
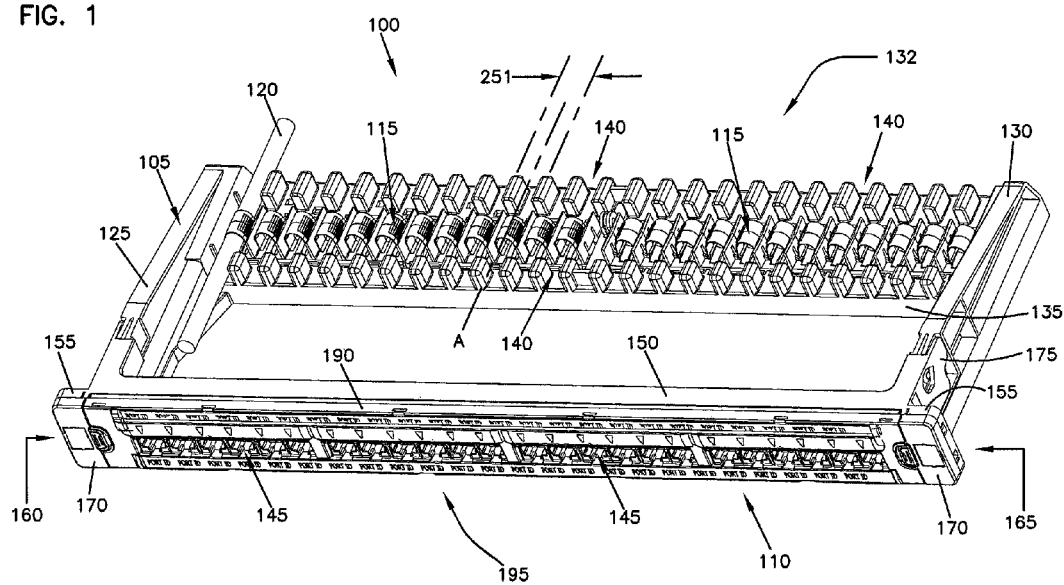
FIG. 1 is a front perspective view of an example patch panel assembly.
Figure 2:
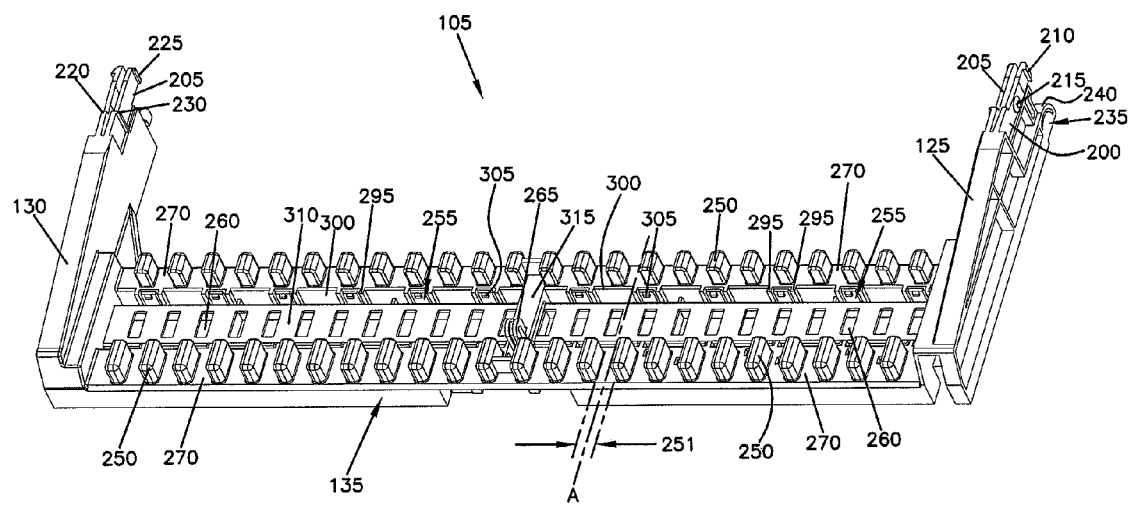
FIG. 2 is a rear perspective view of a cable manager of the patch panel assembly of FIG. 1.
Figure 3:
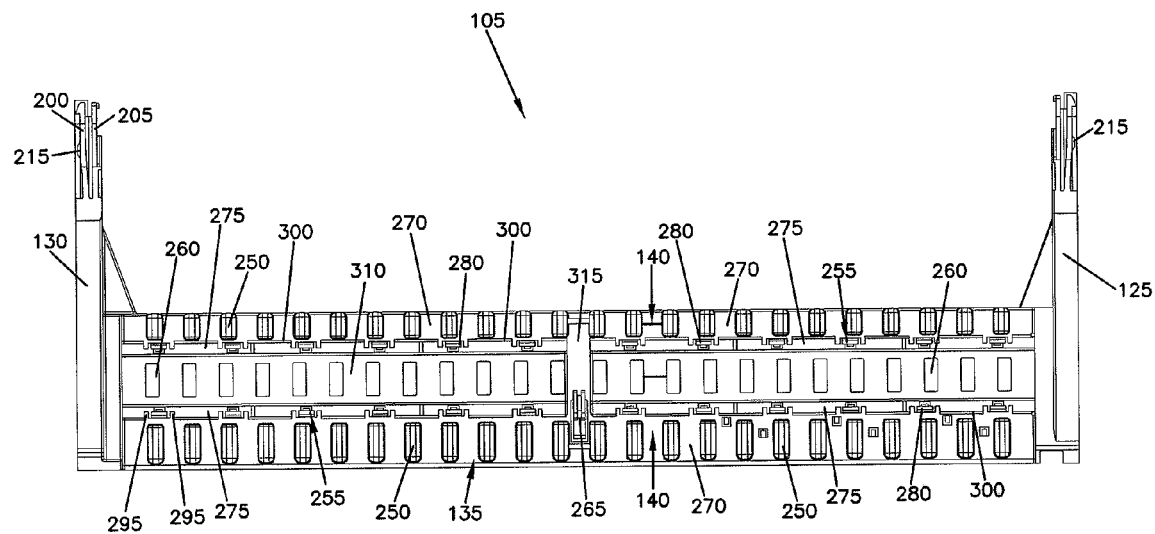
FIG. 3 is a top view of the cable manager of FIG. 2.
Figure 4:
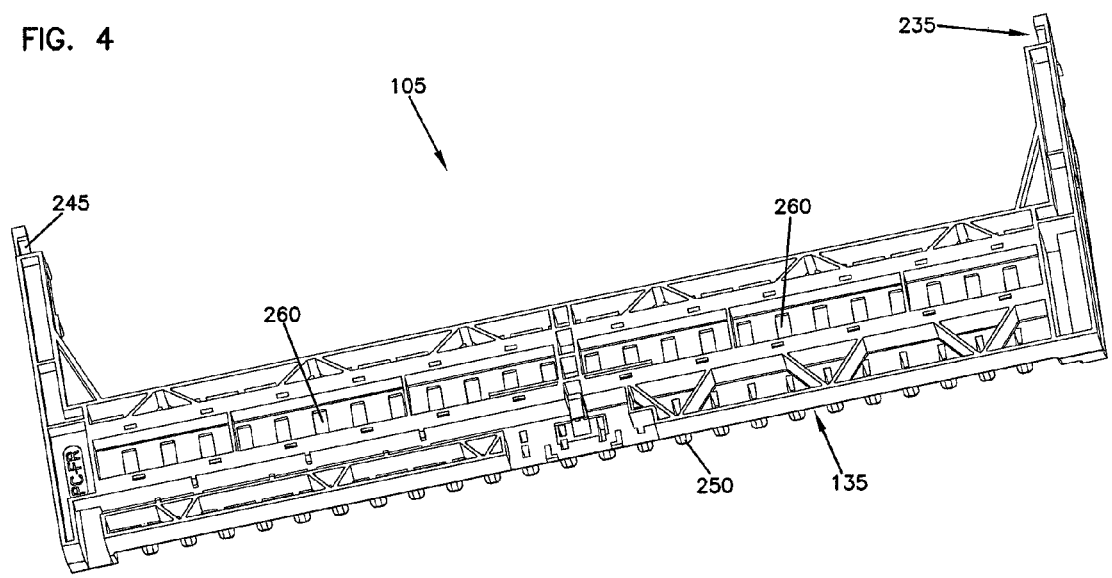
FIG. 4 is a bottom perspective view of the cable manager of FIG. 2.
Figure 5:
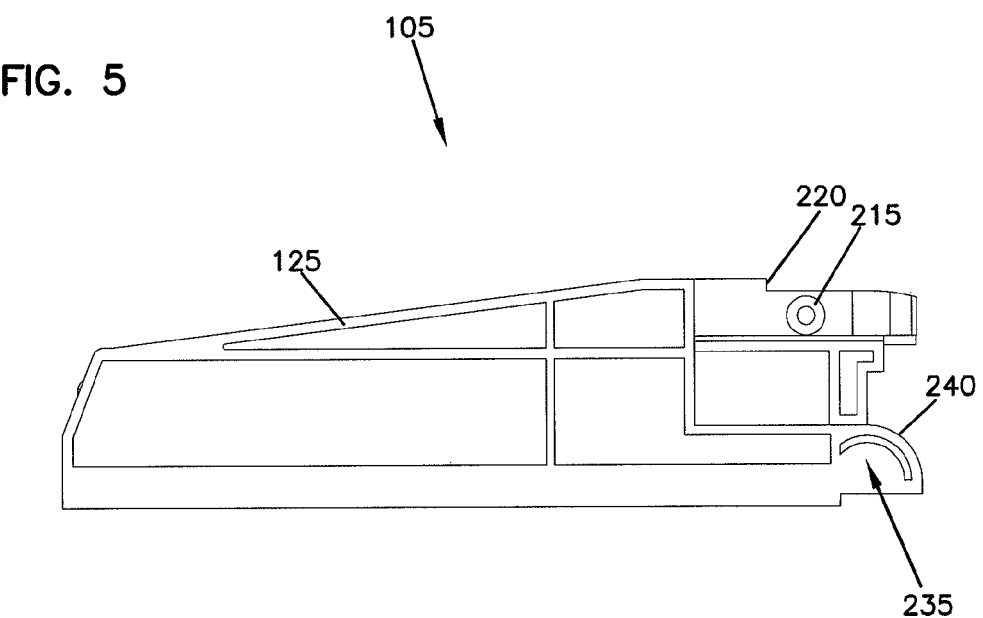
FIG. 5 is a side view of the cable manager of FIG. 2.
Figure 6:
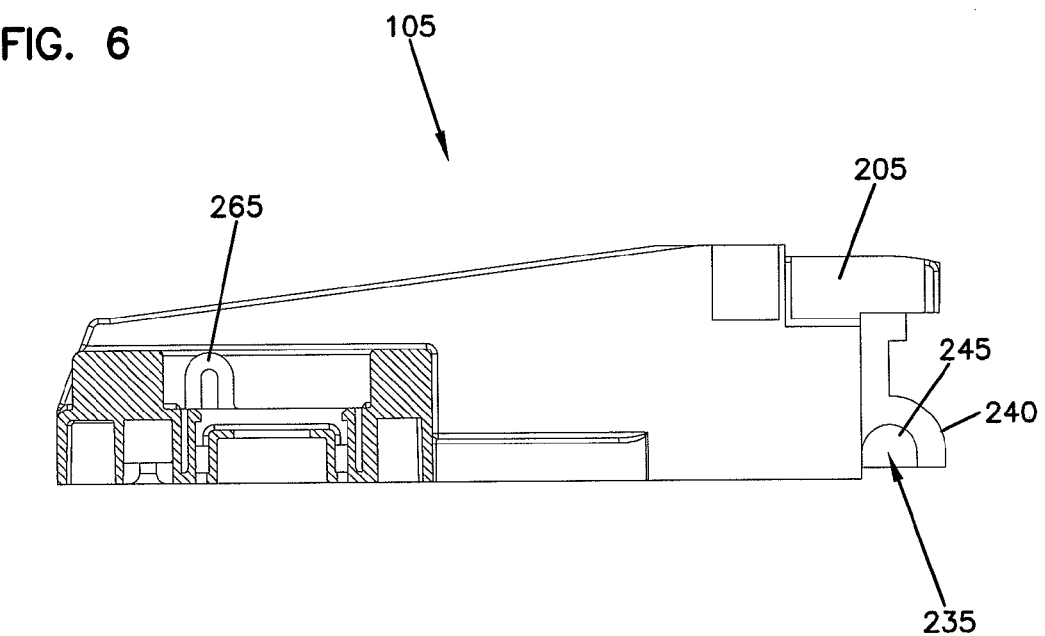
FIG. 6 is a side cross-sectional view of the cable manager of FIG. 2.

FIG. 1 illustrates a preferred embodiment of a patch panel assembly 100 having features in accordance with the principles of the present disclosure. Patch panel assembly 100 includes a cable manager 105, and a front panel 110. Cable manager 105 includes a plurality of holding elements 115. In the preferred embodiment, the holding elements 115 are positioned on a top surface of the cable manager 105 and are provided with a releasable, adjustable cable grip mechanism to allow for the securing of cables 120 of varying cable diameters. In this manner, one or more cables 120 can be secured in place via holding elements 115 and subsequently terminated to respective cable termination elements positioned on the front panel 110. Further, in the preferred embodiment, the front panel 110 is pivotally connected to cable manager 105 to enable access for a telecommunications cable installer to connect a cable 120 to the cable termination elements. It will be appreciated that the one or more cables 120 as referred to in the present disclosure can be of many different types such as a fiber optic cable, an electric conductor cable (e.g., a twisted pair cable), or other cable.

Referring now to FIGS. 1-6, example cable manager 105 is illustrated. In one embodiment, cable manager 105 is a U-shaped fixture having a first end 125, a second end 130, and a tray 135. Tray 135 is positioned between ends 125, 130 on a first side 132 of cable manager 105 to form the U-shape. Each respective end 125, 130 includes a first finger 200 and a second finger 205. First finger 200 is a flexible finger structure and includes a first hook member 210, a button 215, and a first contact surface 220. The second finger 205 includes a guide member 225 and second contact surface 230. Each respective end 125, 130 further includes a pivot member 235 and a pivot surface 240. Pivot member 235 is a hemispherically shaped socket having an inner surface 245. Pivot surface 240 is a radiussed surface. Both inner surface 245 and pivot surface 240 are formed to interact with complementary features on front panel 110, thereby enabling a pivoting action of front panel 110 with respect to cable manager 105.

Tray 135 includes a plurality of features to facilitate the retention and organization of one or more cables 120. For example, in one embodiment, tray 135 includes a plurality of holding elements 115 adjacently arranged with respect to each other between ends 125, 130. In one embodiment, twenty four holding elements 115 are positioned in a single row on tray 135. In a preferred embodiment, one or more holding elements 115 are formed together in a unit that is separately connectible to tray 135, described in further detail below. In the preferred embodiment, tray 135 includes a plurality of features to facilitate the connection of the one or more holding elements 115 to tray 135. For example, tray 135 includes a plurality of holder retainment clips 255 and a plurality of holder apertures 260. Holder retainment clips 255 are flexible cantilever tabs that have one end rigidly fixed to tray first bottom surface 275 and a second free end 280. Further, each respective holder retainment clip 255 is enclosed on three sides by a plurality of housing ridges 295 and an inner tray surface 300. Respective housing ridges 295 form the sides of the enclosure and are integrally formed on inner tray surface 300, wherein inner tray surface 300 forming the third side. Additionally, each respective holder retainment clip 255 includes a securing tab 305. In a preferred embodiment, twelve holder retainment clips 255 are periodically positioned along a length of a respective inner tray surface 300. Holder apertures 260 are positioned on a tray bottom surface 310. In a preferred embodiment, two groups of twelve holder apertures 260 are periodically spaced with respect to each other, separated by a pin surface 315. Each respective holder aperture 260 is generally rectangular in shape and is sized to receive a complementary feature of a respective holding element 115.

In one embodiment, tray 135 additionally includes a plurality of cable guide separator tabs 250. Cable guide separator tabs 250 are periodically spaced with respect to each other and are arranged in rows along a respective tab surface 270 between ends 125, 130. In a preferred embodiment, twenty-four cable guide separator tabs 250 are positioned on each respective tab surface 270. In one aspect, holding elements 115 are positioned between rows of respective cable guide separator tabs 250. Further, holding elements 115 are orientated to hold cables 120 in parallel alignment with an axis A coincident along a space 251, formed between adjacent cable guide separator tabs 250, to form a channel 140. In this manner, cable guide separator tabs 250 can guide and maintain cable 120 orientation such that a given cable 120 can be positioned and secured by a respective holding element 115.

In a preferred embodiment, cable manager 105 is formed from a resilient material having desirable properties for a telecommunications application. For example, cable manager 105 can be formed from a glass filled polycarbonate to provide stability, strength, and stiffness over a wide range of conditions.

As referred to above, patch panel assembly 100 includes a front panel 110. In one embodiment, front panel 110 includes a first panel end 160 and a second panel end 165 and is coupled to the cable manager 105 on a side opposite from tray 135. In a preferred embodiment, front panel 110 is pivotally connected to cable manager 105, described in further detail below. In general, front panel 110 includes a plurality of cable termination elements to enable inter-connection or cross-connection between telecommunications equipment. For example, a front cable termination panel 190 is positioned on a panel portion 195 between panel ends 160, 165, as shown in FIG. 1. Cable termination panel 190 includes a plurality of evenly spaced cable connections 145. In one aspect, cable connections 145 are a standardized physical interface such as a registered jack (RJ) interface (e.g., RJ-45). A portion of each cable connection 145 is positioned through a housing 150. The portion of cable connection positioned through housing 150 terminates in a corresponding cable termination element 151 (i.e., insulation displacement connectors, or IDC's) such that a cable 120 can be connected to the cable termination element 151. In one example, a cable 120 such as a multi-pair cable Ethernet cable is provided and the individual cable conductors are seated in a respective IDC via a punch-down tool. Front cable termination panel 190 is a separate component from housing 150 (compare FIGS. 1 and 7).

Figure 7:
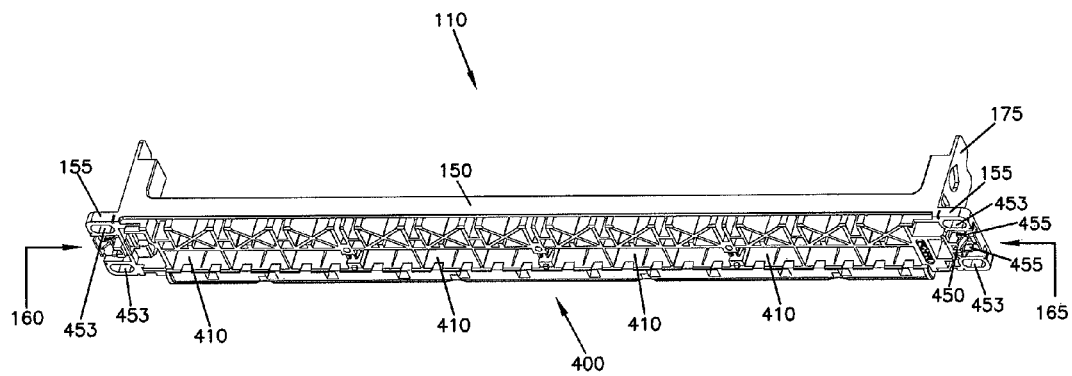
FIG. 7 is a perspective view of a front panel of the patch panel assembly of FIG. 1.
Figure 8:
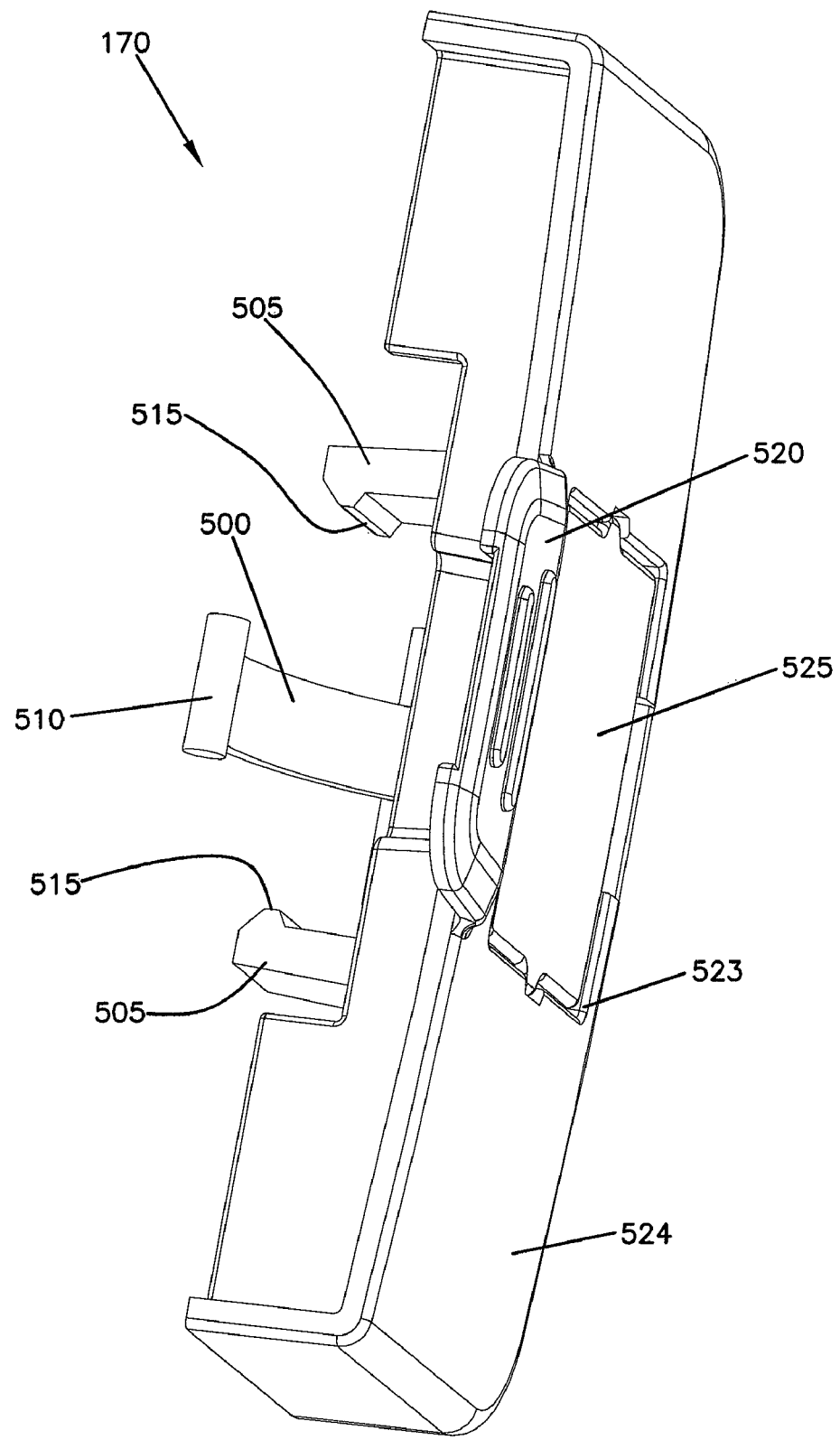
FIG. 8 is a perspective view of a side cover element of the patch panel assembly of FIG. 1.
Figure 9:
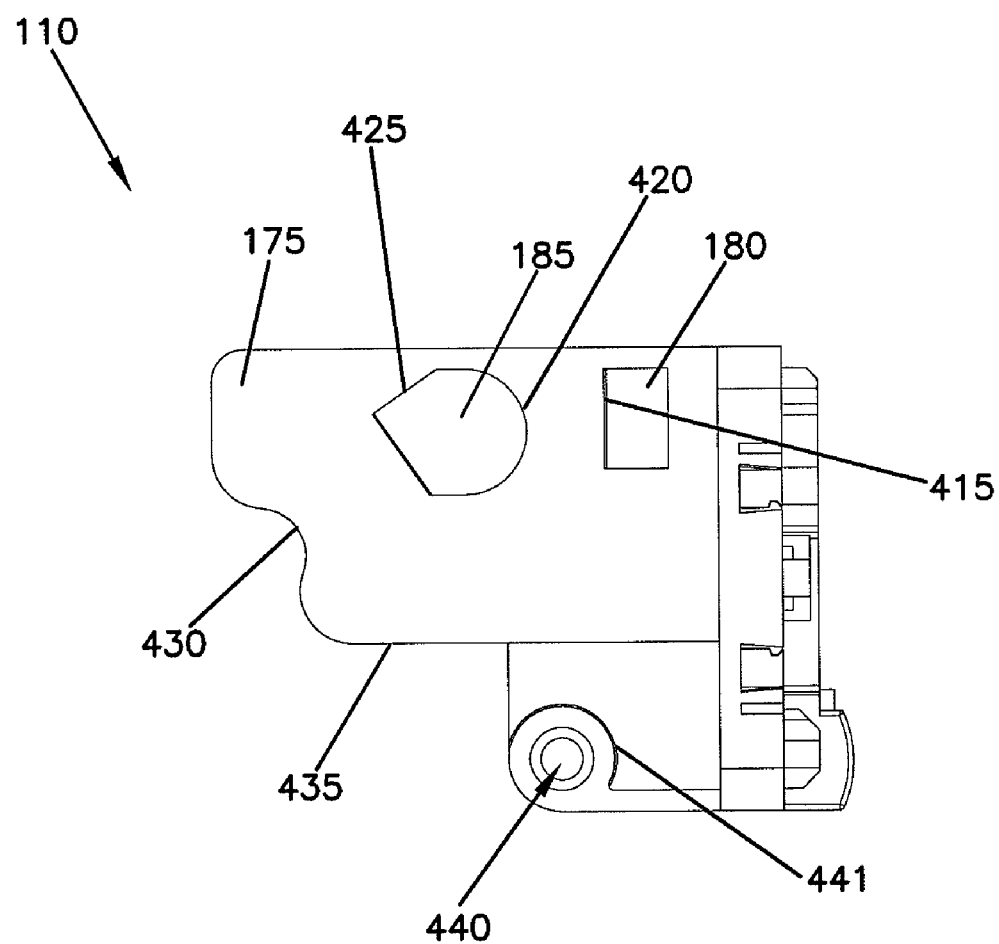
FIG. 9 is a side view of the front panel of FIG. 7.

Referring now to FIGS. 7-9, front panel 110 includes a support structure 155 positioned at both first panel end 160 and second panel end 165. In one aspect, support structure 155 includes a plurality of receiving apertures 453, a primary clip element 450, and a plurality of secondary hook elements 455. Receiving apertures 453 are generally oval shaped and are formed to receive fasteners (not shown) such that the patch panel assembly 100 can be positioned on a rack, a switch cabinet, wall bracket, or other securing surface.

In certain embodiments, a side cover element 170 is positioned to complementary features on support structure 155, as shown in FIG. 1. In one embodiment, side cover element 170 can be clipped into complementary features on each respective support structure 155. In the preferred embodiment, side cover element 170 includes a flexible retention tail 500 having a primary hook flange 510, a plurality of secondary clip elements 505 having respective secondary hook members 515, a clip-lock release surface 520, and a front cover 525, as shown in FIG. 8. In the described embodiment, primary hook flange 510 and respective secondary hook members 515 are formed to be received by primary clip element 450 and a secondary hook elements 455, respectfully. In this manner, side cover element 170 can be clipped into support structure 155.

Flexible retention tail 500 is engaged to complementary features on support structure 155 such that side cover element 170 can be moved aside but still remain engaged to support structure. For example, a clip-lock release surface 520 can be engaged with a finger or a tool to disengage the plurality of secondary receiving clip elements 455 from respective secondary hook members 515. In the described embodiment, provision is made wherein the primary hook flange 510 is positioned with respect to primary receiving clip element 450. In this manner, the side cover element 170 can be moved aside from support structure 155 such that the plurality of receiving apertures 453 can be accessed, without releasing side cover element 170 from the support structure 155.

Flexible retention tail 500 is fully disengagable from support structure 155 if desired. In the described embodiment, further pulling on the side cover element 170 fully disengages both the plurality of secondary receiving clip elements 455 from respective secondary hook members 515 and the primary hook flange 510 from the primary receiving clip element 450. In this manner, side cover element 170 can be completely removed from support structure 155, thereby allowing access to the plurality of receiving apertures 453.

Side cover element 170 includes a trough 523 on a front face 524 in which an inscription area is arranged. Trough 523 is covered by a transparent cover 525. In a preferred embodiment, front cover 525 is flexible and made for example from a plastic.

Adjacent to each respective support structure 155 is a retainment flange 175 having a first retainment aperture 180 and a second retainment aperture 185. First retainment aperture 180 is rectangular in shape and includes a first surface 415. Second retainment aperture 185 includes a curved section 420 and a V-shaped second surface 425. Retainment flange 175 further includes a secondary pivot surface 435 that contacts pivot surface 240 on cable manager 105 to facilitate pivoting action.

Figure 10:
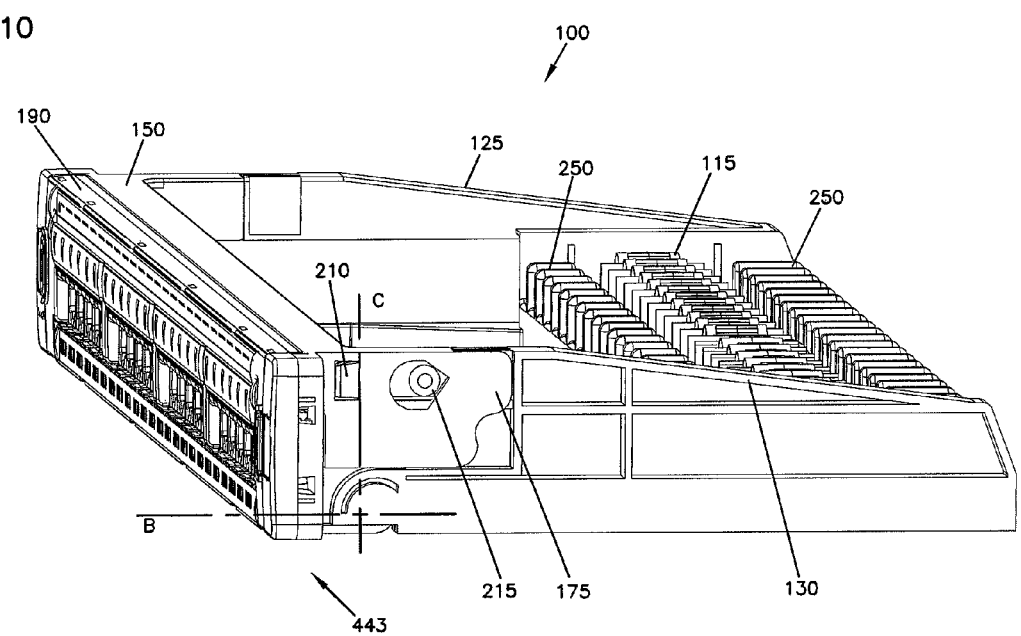
FIG. 10 is a perspective view of the patch panel assembly illustrating the cable manager and the front panel in a normal position.
Figure 11:
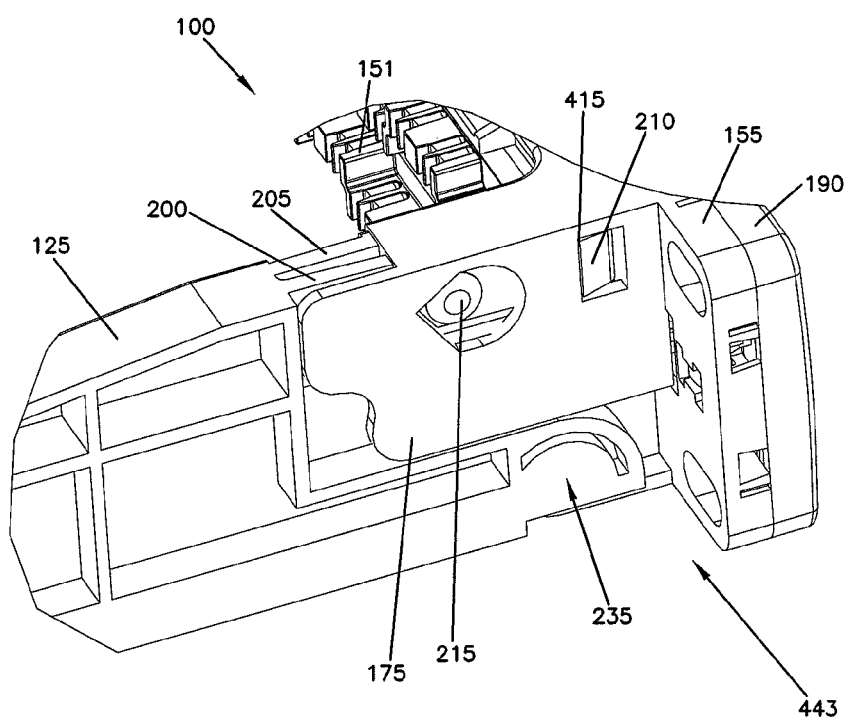
FIG. 11 is another perspective view of the patch panel assembly illustrating the cable manager and the front panel in the normal position.
Figure 12:
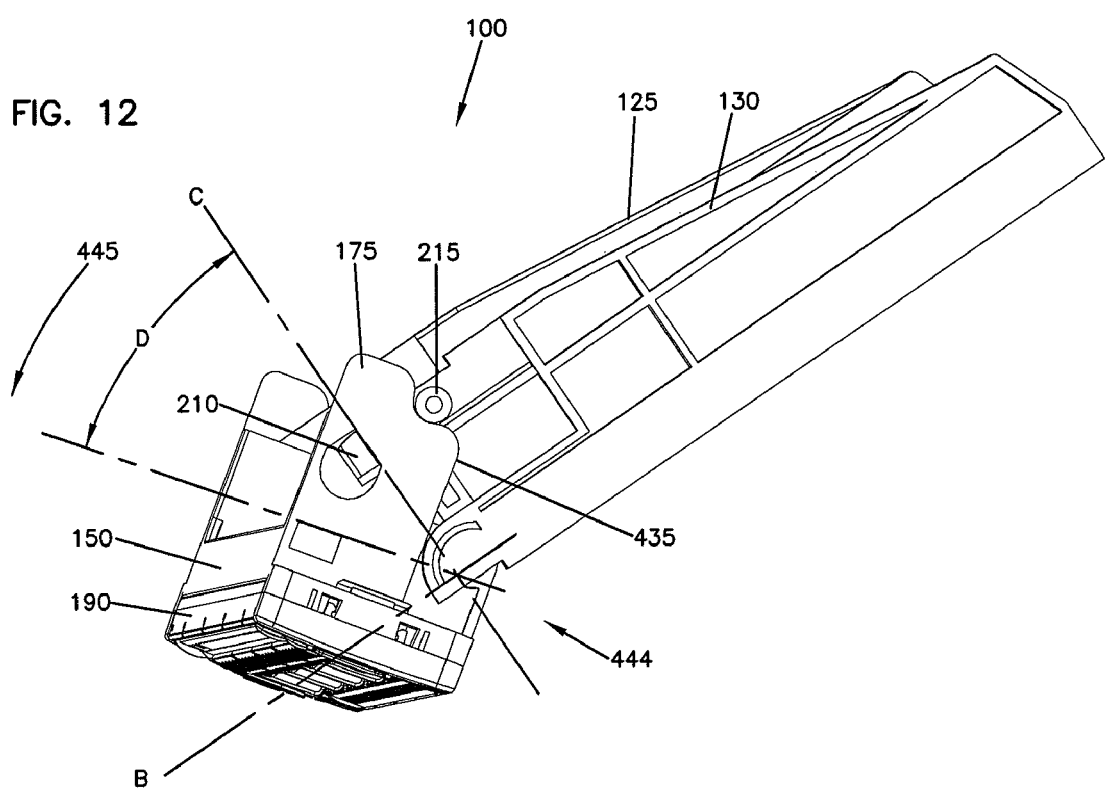
FIG. 12 is a perspective view of the patch panel assembly illustrating the cable manager and the front panel in a pivoted position.
Figure 13:
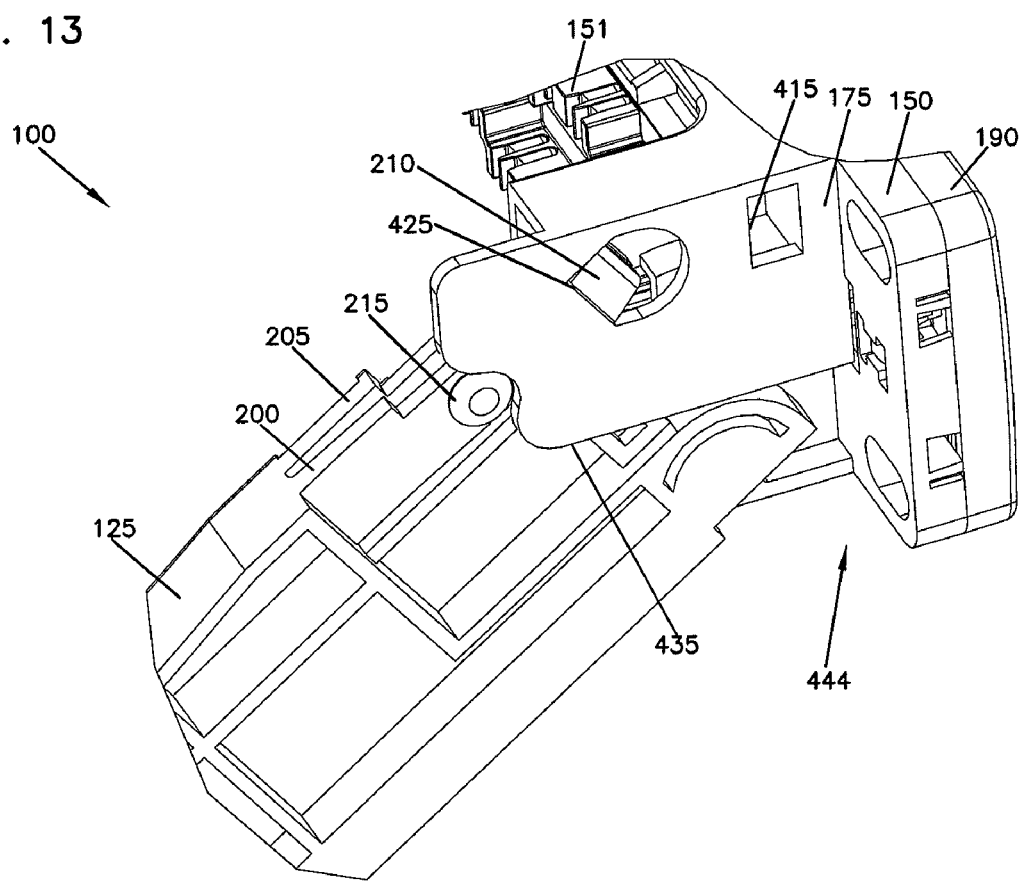
FIG. 13 is another perspective view of the patch panel assembly illustrating the cable manager and the front panel in the pivoted position.

Positioned near retainment flange 175 on both ends 160, 165 of front panel is a pivot pin 440 that engages with pivot member 235 on the cable manager 105 to form a hinge. In a preferred embodiment, pivot pin 440 is inserted into pivot member 235 such that a pivot pin surface 441 engages with inner surface 245. In the described embodiment, pivot member 235 and pivot pin 440 enable a pivoting action of the front panel 110 with respect to cable manager 105. For example, front panel 110 can be pivotally actuated between a normal position 443, as depicted in FIGS. 1, 10 and 11, and a pivoted position 444 as shown in FIGS. 12 and 13. In the normal position 443 first hook member 210 of cable manager 105 is engaged with first surface 415 defined by the first retainment aperture 180 to secure the front panel 110 to the cable manager 105, and the front panel 110 is positioned at 0 degrees with respect to axis C.

Front panel 110 is pivotally actuated to the pivoted position 444 via depression of button 215 to deflect first finger 200. In general, curved section 420 of second retainment aperture 185 is sized such that a user has easy access to button 215. In this manner, first hook member 210 is disengaged from first surface 415 to enable front panel 110 to pivot in direction 445 through an angle D measured with respect to axis C. Upon spatial clearance of first hook member 210, with respect to first retainment aperture 180 during pivoting action, button 215 is released by user. Pivoting action continues in direction 445 until front panel 110 is secured in the pivoted position 444 via interaction between first hook member 210 and second surface 425 of the second retainment aperture 185. A first curved surface 430 formed on retainment flange 175 is positioned coincident with button 215 in the disengaged position.

In example embodiments, the front panel 110 is pivotable through an angle D between 0 degrees and 90 degrees. In a preferred embodiment, the front panel 110 is pivotable to an angle of about 35 degrees when in the pivoted position. A front panel 110 in a disengaged position is optimally positioned with respect to cable manager 105 such that an installer has easy access to respective cable termination elements 151 to punch down respective cable conductor elements.

Front panel 110 can be fully disengaged from the cable manager 105 by pivoting the front panel 110 through an angle of 90 degrees with respect to the cable manager 105. In this manner, pivot pin 440 is removable from pivot member 235.

In one embodiment, front panel 110 is formed from a resilient material having desirable properties for a telecommunications application. For example, front panel 110 can be formed from a glass filled polycarbonate to provide stability, strength and stiffness over a wide range of conditions.

Figure 14:
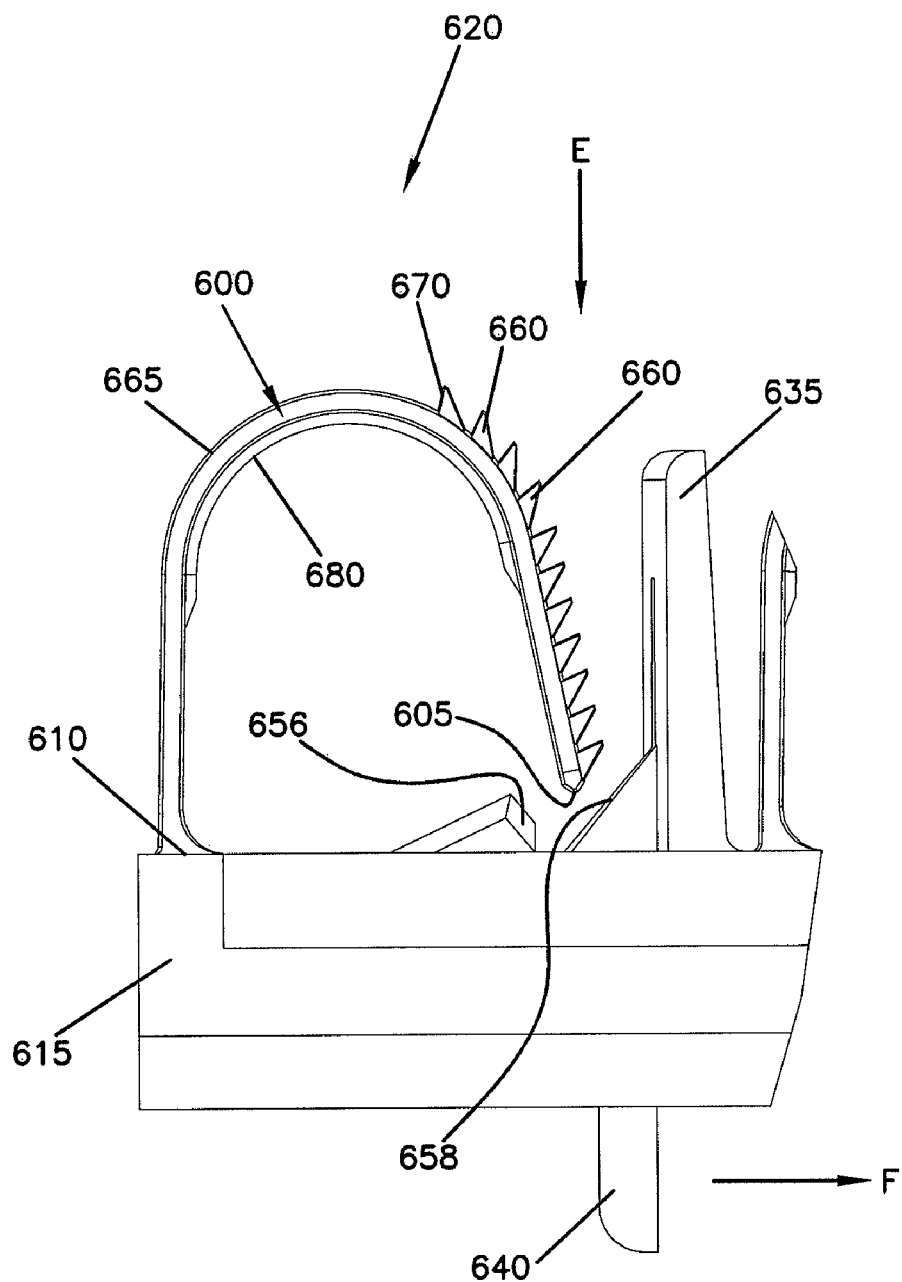
FIG. 14 is an enlarged side view of a holding element and base structure a cable grip holder.
Figure 15:
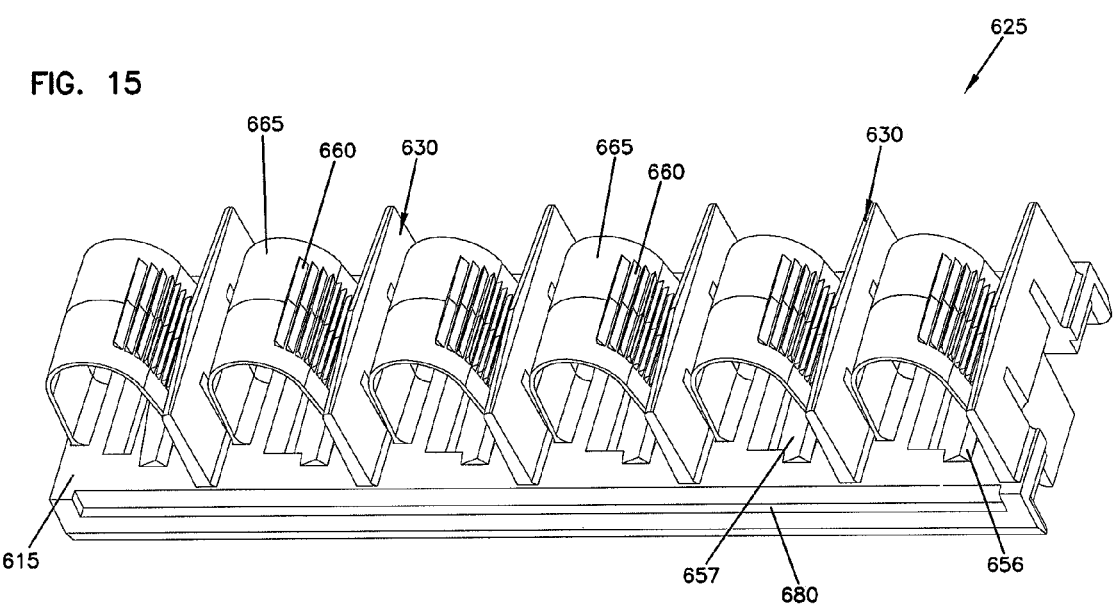
FIG. 15 is a perspective view of the cable grip holder.
Figure 16:
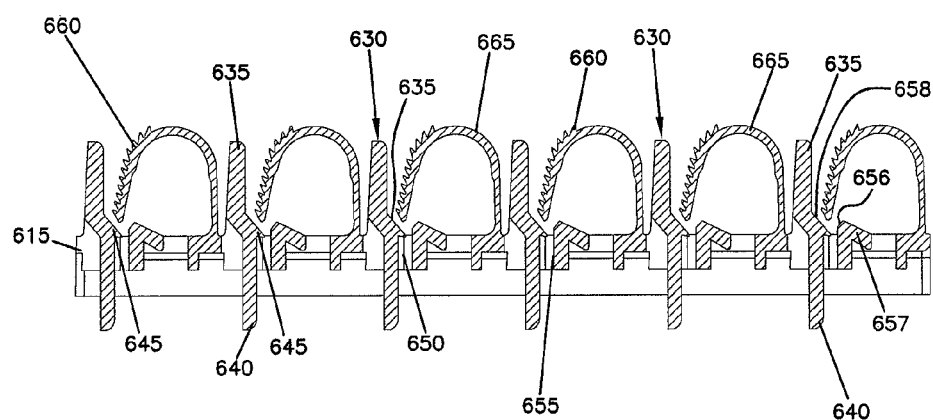
FIG. 16 is a side cross-sectional view of the cable grip holder of FIG. 14.
Figure 17:
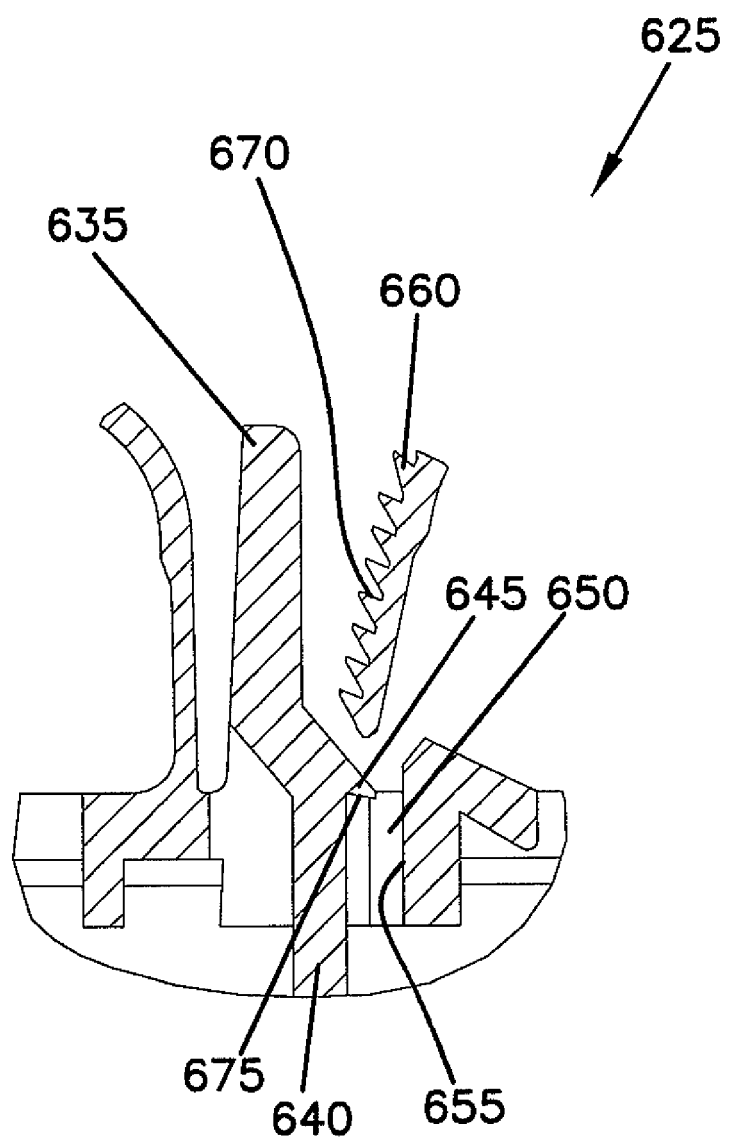
FIG. 17 is an enlarged side cross-sectional view of the cable grip holder of FIG. 14.
Figure 18:
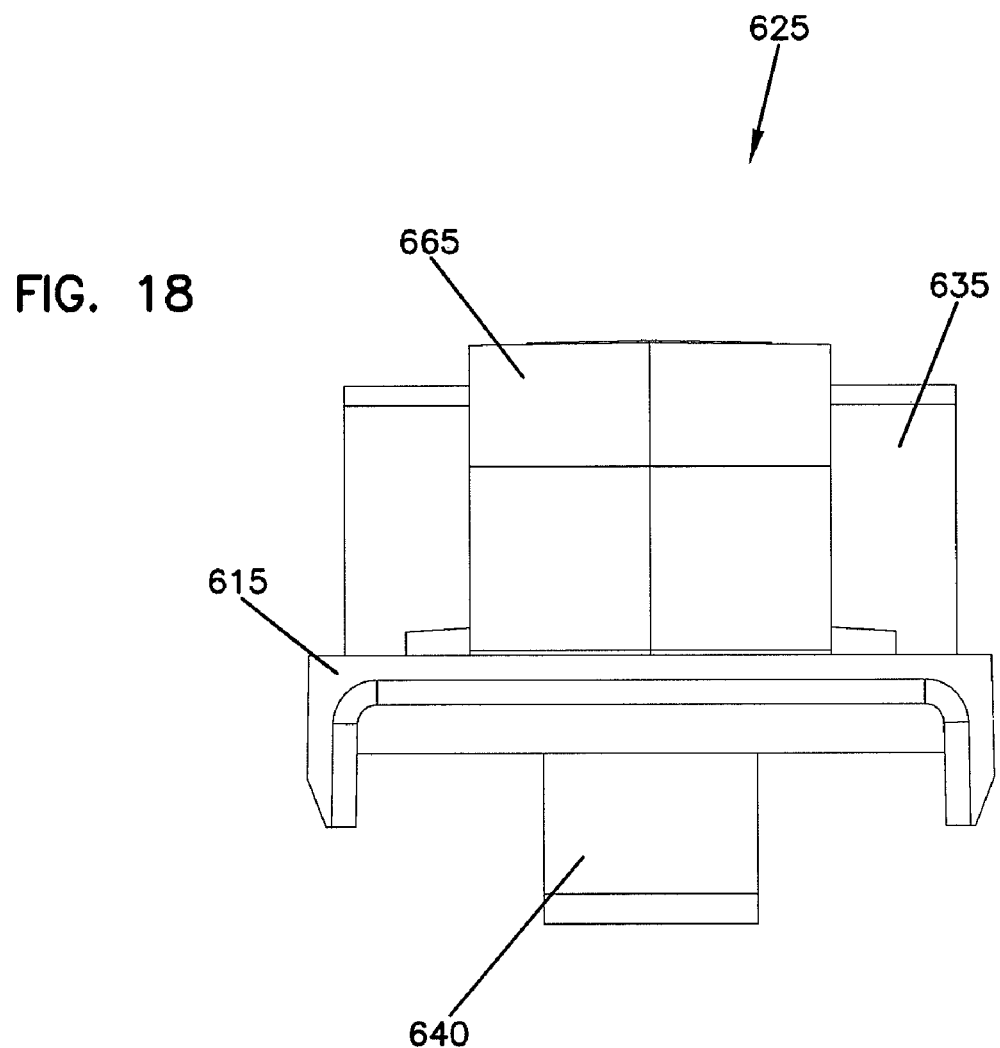
FIG. 18 is a first end view of the cable grip holder of FIG. 14.
Figure 19:
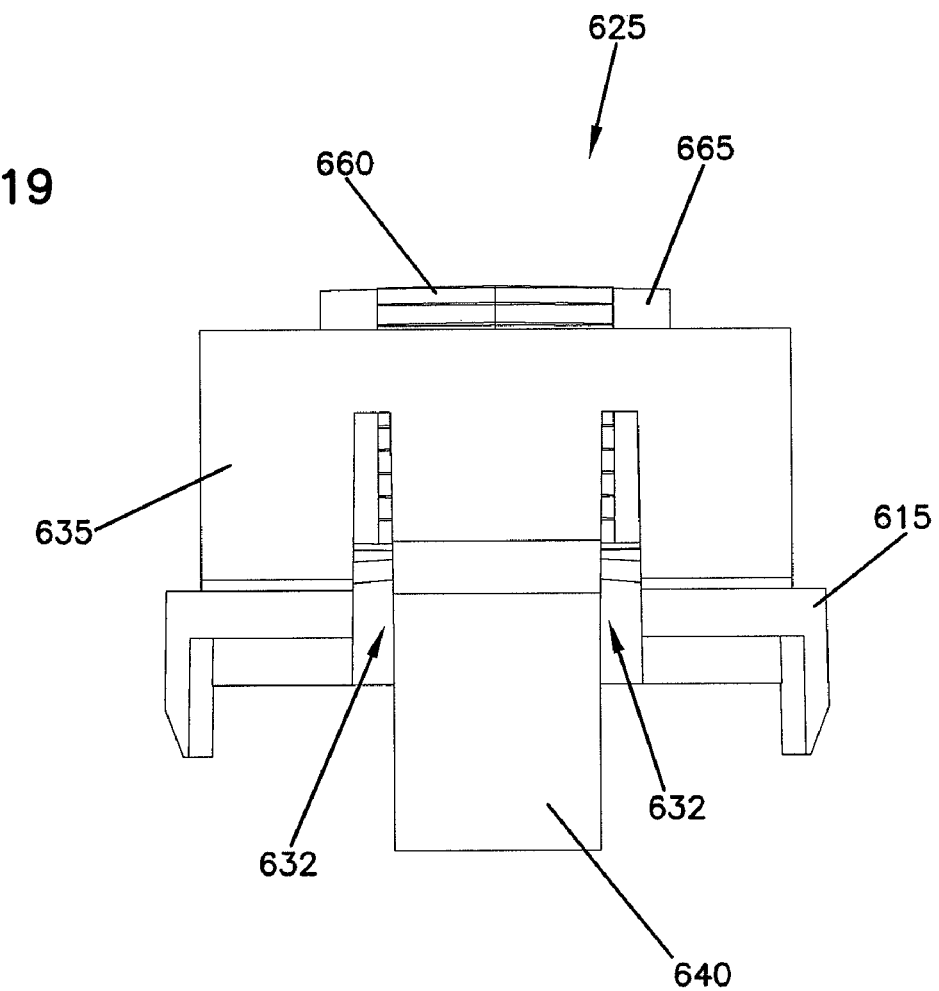
FIG. 19 is a second end view of the cable grip holder of FIG. 14.

Referring now to FIGS. 14-19, a holding element 600 is provided. In a preferred embodiment holding element 600 is a flexible loop structure having a distal end 605 and a proximal end 610 formed into a base structure 615. In the described embodiment, a single holding element 600 and base structure 615 form a holder unit 620, as shown in FIG. 14. In an alternative embodiment, a plurality of holder units 620 are formed together to form a cable grip holder 625, as shown in FIG. 15. In example embodiments, generally between two to twelve holder units 620 are formed together to form a cable grip holder 625. In a preferred embodiment, six holder units 620 are formed together to form a cable grip holder 625. Extending through the base structure 615 is a tab 630 having a rigid portion 635 and a flexible portion 640. Rigid portion 635 extends above the base structure 615 and functions as a cable separator surface. Flexible portion 640 extends below the base structure 615 and functions as a release mechanism of the holding element 600, described in further detail below. A receiving tooth 645 is formed on tab 630 and a passage 650 is defined between flexible portion 640 of tab 630 and a passage surface 655.

In one embodiment, a cable grip holder 625 is positioned onto tray 135 of the cable manager 105 by positioning flexible portion 640 of a respective tab 630 through a respective holder aperture 260 positioned the tray bottom surface 310, as described above. Cable grip holder 625 are placed onto tray 135 such that respective holding elements 600 formed on a respective cable grip holder 625 can be orientated with distal end 605 positioned towards either end 125, 130 of the cable manager 105, as illustrated in FIG. 1. Cable grip holder 625 is secured to tray 135 via a plurality of securing tabs 305 that engage clip surface 680, described in detail above. In one embodiment, the cable grip holder 625 is removed from tray 135 by depressing the respective holder retainment clips 255 towards inner tray surface 300 via cantilever action.

Holding element 600 includes a plurality of teeth 660 periodically spaced and aligned transversely on a top surface 665 to enable holding element 600 to be locked to form a closed loop. For example, holding element 600 can be locked into place by applying force to the holding element 600 in a direction E such that distal end 605 is inserted into passage 650. Distal end 605 is guided into passage 650 by a first guide surface 656 on a guide structure 657 and a second guide surface 658 on tab 630. Pressure is asserted on holding element 600 until a desired diameter of a formed closed loop of closed holding element 600 passage is achieved. The desired diameter can be determined by selecting a specific tooth element 660 to lock. As force is removed, bias in the holding element 600 imparts a force in direction opposite of direction E, thereby engaging a first grip surface 670 of the desired tooth element 660 with a second grip surface 675 of receiving tooth 665, locking holding element 600 in place. To unlock holding element 600, a force is applied in direction F on flexible portion 640 of tab 630 such that first grip surface 670 disengages with second grip surface 675, allowing the holding element 600 to be moved out of passage 650. Flexible portion 640 of tab 630 is provided with flexibility via slots 632 formed in the rigid portion 635 of tab 630.

In a preferred embodiment, a cable 120 is secured by holding element 600 by positioning cable 120 into holding element 600 and applying force to the holding element 600 such that the distal end 605 is inserted into passage 650 until an inner surface 680 of the holding element 600 engages with an outer jacket of the cable 120. Upon removing force from holding element 600 the aforementioned tension in the holding element 600 imparts a force in direction opposite of direction E, thereby engaging first grip surface 670 with second grip surface 675 of receiving tooth 665. In this manner, holding element 600 is locked to secure cable 120. It will be appreciated that the size of the holding element 600 and the number of teeth 660 can be designed to grip a cable of variable size. As such, in the preferred embodiment a cable 120 of arbitrary diameter can be secured. To release cable 120 from holding element 600, a force is applied in direction F on flexible portion 640 of tab 630 such that first grip surface 670 disengages with second grip surface 675, allowing the holder element 600 to be moved out of passage 650.

In a preferred embodiment, holding element 600 is formed from a resilient material such as nylon or plastic. Holder units 620 and cable grip holders 625 can be used in a variety of locations in telecommunications frames and equipment, in addition to the illustrated panel assembly 100.

Figure 20:
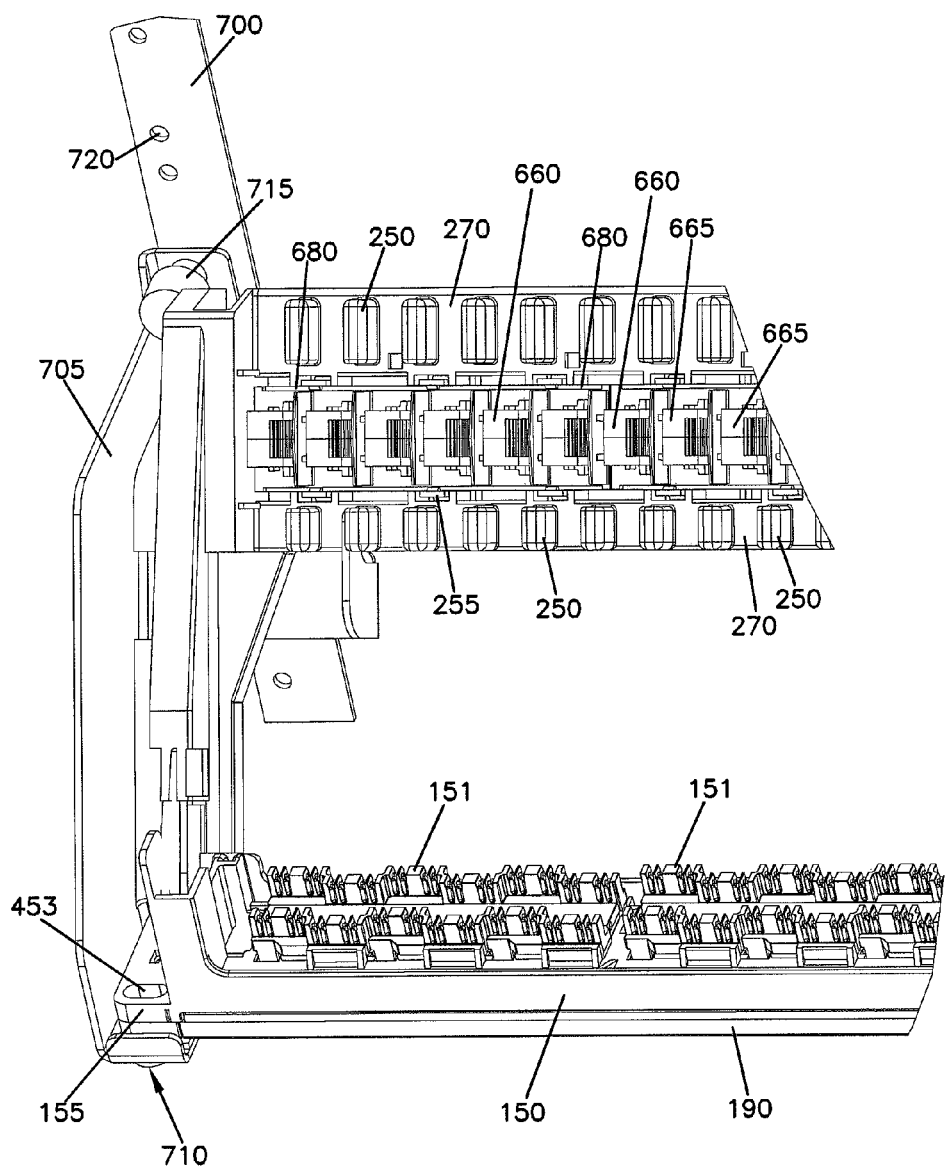
FIG. 20 is a top perspective view of a patch panel assembly held by a panel support, illustrating the cable manager and the front panel in the pivoted position.
Figure 21:
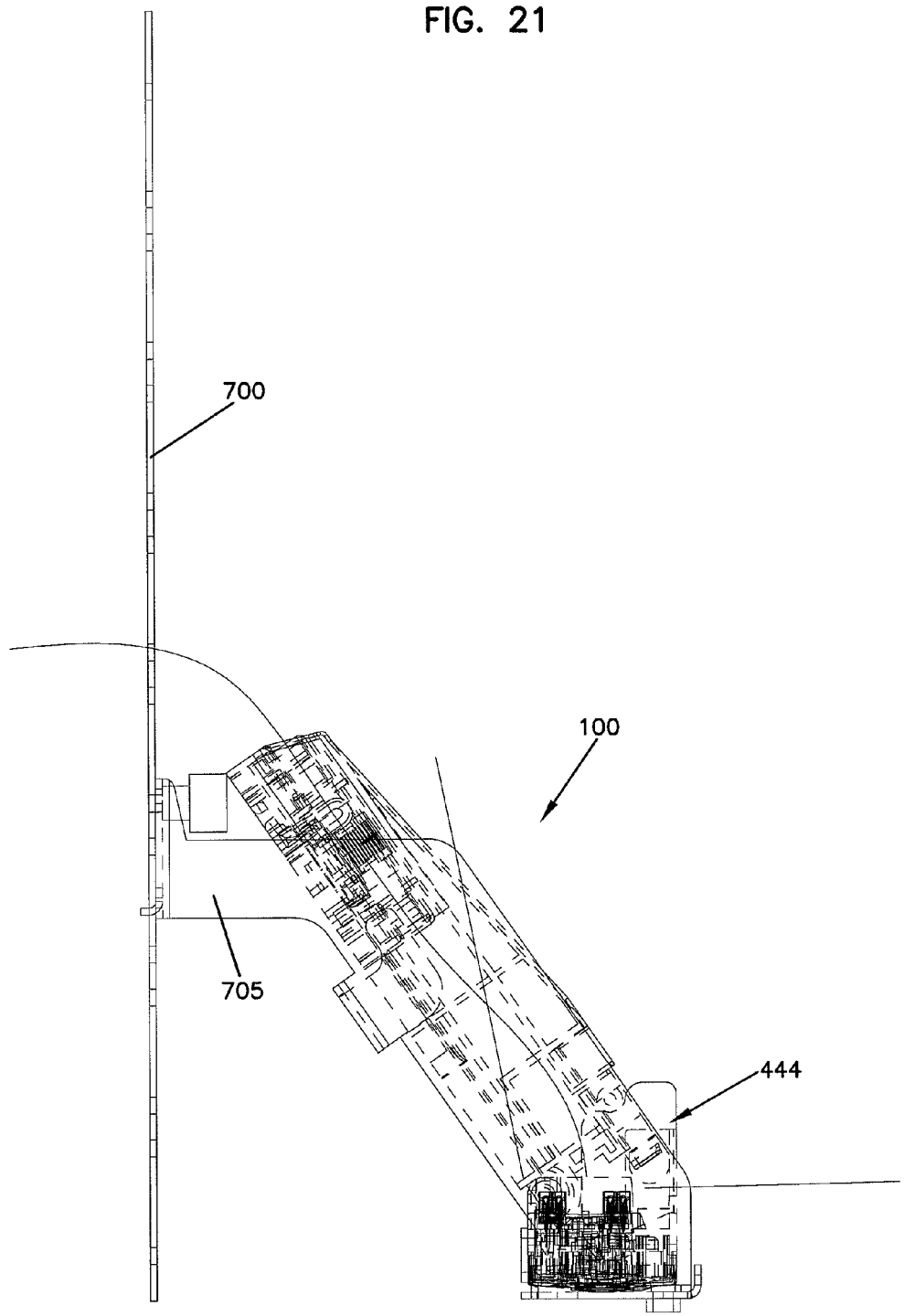
FIG. 21 is a side view of the patch panel assembly held by the panel support, illustrating the cable manager and the front panel in the pivoted position.
Figure 22:
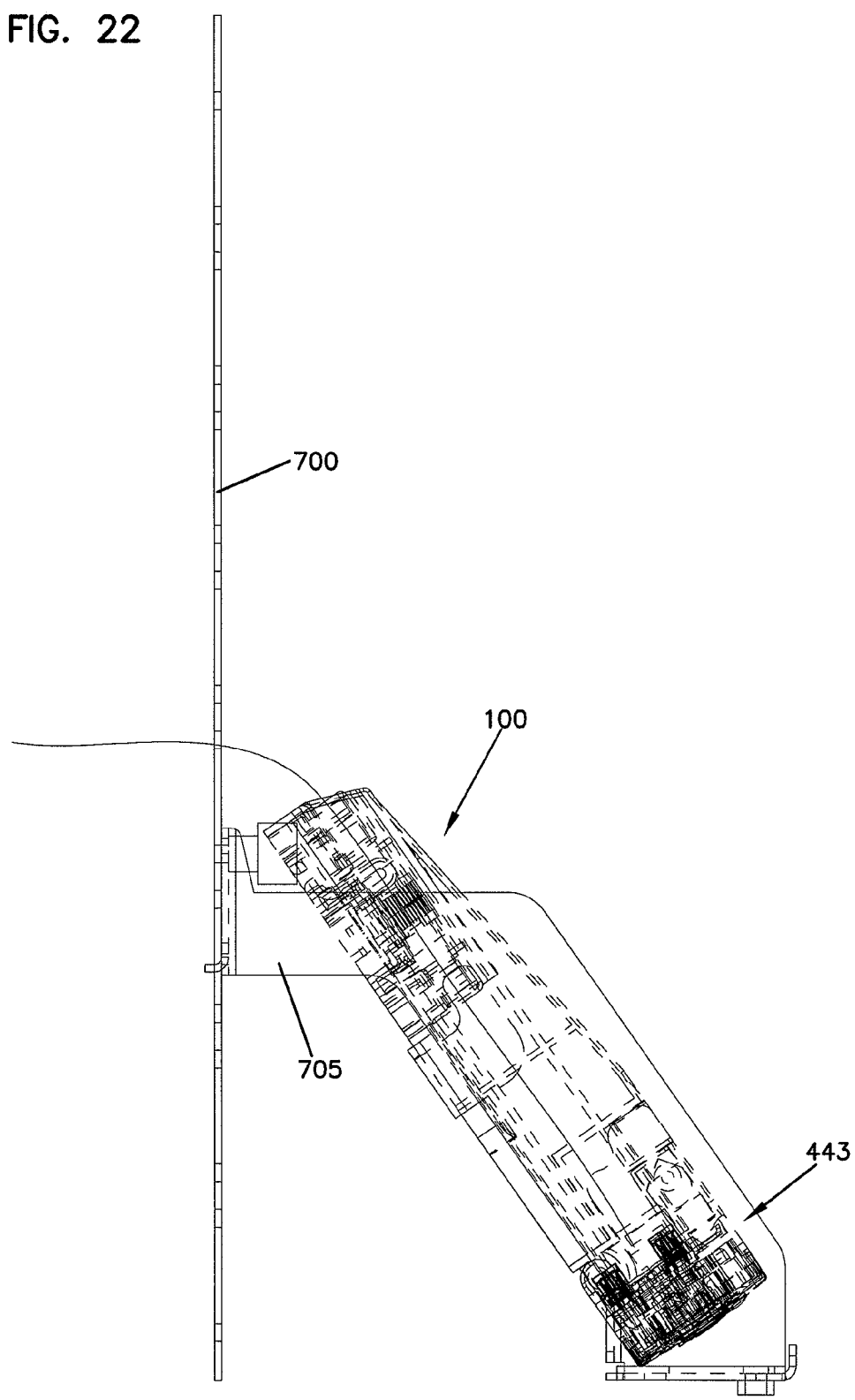
FIG. 22 is a side view of a patch panel held by the panel support, illustrating the cable manager and the front panel in the normal position.

Referring now to FIGS. 20-22, a patch panel assembly 100 according to the principles of the present disclosure is depicted during use. In the example embodiment, patch panel assembly 100 is positioned on an installation mount bracket 705. Bracket 705 is mounted to a rack 700 via fasteners 715 during cable installation and/or maintenance. Upon completion of cable installation and/or maintenance, the bracket 705 is removed from rack 700, and then patch panel assembly 100 is mounted to rack 700 via a plurality of fasteners 710 inserted into respective receiving apertures 453 of a respective support structure 155.

In one aspect, during the installation and/or maintenance process one or more cables 120 are engaged to respective holding elements 600, then the cables 120 are terminated to respective cable termination elements 151 on the front panel 110. In this manner, a method of organizing and terminating a cable 120 to a patch panel assembly 100 is provided. The method includes pivoting a front panel 110 from a normal position 443 to a pivoted position 444 relative to cable manager 105. Then, one or more conductors of one or more cables 120 are connected to the front panel 110. In one example, a punch down tool is utilized to punch down exposed conductor elements of a cable 120 to a respective IDC 151. Next, the one or more cables 120 are inserted into one or more holding elements 600 on the tray 135. In one example embodiment, the cable 120 can be positioned into the holding element 600 by inserting the cable 120 through an open loop formed by an unlocked holding element 600 and then threading the cable 120 through the loop. Alternatively, holding element 600 can be deformed by an application of force such that the cable 120 can be positioned into the holding element 600 by pressing the cable 120 lengthwise into the holding element 600. Following the insertion of the one or more cables 120 to the one or more holding elements 600, the front panel 110 is pivoted from the pivoted position 444 to the normal position 443. Subsequently, the holding elements 600 are locked to secure the one or more cables 120.

The preceding embodiments are intended to illustrate without limitation the utility and scope of the present disclosure. Those skilled in the art will readily recognize various modifications and changes that may be made to the embodiments described above without departing from the true spirit and scope of the disclosure.

The invention claimed is:

1. A telecommunications patch panel assembly comprising:
   a cable manager having a first side and an opposite second side and extending between a first end and a second end, the cable manager having a tray positioned at the first side between the first end and the second end, wherein each end of the cable manager includes a respective first finger, each first finger including a first hook member and a button;
   a front panel pivotally connected to the first and second ends at the second side of the cable manager, wherein the front panel is pivotable between an engaged position and a disengaged position and wherein the front panel includes a plurality of connector locations, and wherein the front panel includes a first retainment flange at a first end of the front panel and a second retainment flange at a second end of the front panel, each retainment flange defining a first aperture and a second aperture; and
   a cable grip holder on the tray including:
      a base including:
         a passage defined through the base; and
         a receiving tooth formed on the base adjacent to the passage; and
      a plurality of holding elements each for securing a cable including:
         a terminated end affixed to the base;
         a distal end; and
         a plurality of periodically spaced teeth formed on a top surface;
   wherein each holding element is locked into place by inserting the distal end into the passage until a selected tooth element engages the receiving tooth.

2. The telecommunications patch panel assembly of claim 1, wherein the base includes a clip surface for securing the cable grip holder to the cable manager.

3. The telecommunications patch panel assembly of claim 1, wherein the tray includes a plurality of separator tabs.

4. The telecommunications patch panel assembly of claim 1, further comprising flanges on the ends of the front panel defining fastener opening, and a side cover to cover each flange.

5. The telecommunications patch panel assembly of claim 1, wherein the holding element includes a flexible curved loop structure.

6. The telecommunications patch panel assembly of claim 1, further comprising a tab on the base, wherein the tab includes a flexible portion, and wherein the flexible portion functions as a release mechanism of the holding element.

7. The telecommunications patch panel assembly of claim 1, wherein the first hook member of each first finger engages the first aperture of a respective one of the retainment flanges when the front panel is in the engaged position and wherein the first hook member of each first finger engages the second aperture of the respective one of the retainment flanges when the front panel is in the disengaged position.

8. The telecommunications patch panel assembly of claim 7, wherein the button of each first finger is positioned at a first curved surface formed on a respective one of the retainment flanges when the front panel is in the disengaged position.

9. The telecommunications patch panel assembly of claim 1, wherein the first retainment aperture is rectangular in shape, and wherein the second retainment aperture includes a curved section and a V-shaped second section.

10. A cable grip holder comprising:
   a base including:
      a tab formed through the base extending from below the base to above the base;
      a receiving tooth formed on the tab; and
      a passage defined through the base; and
   a plurality of curved holding elements for securing a cable, including:
      a terminated end affixed to the base;
      a distal end; and
      a plurality of periodically spaced teeth formed on a top surface;
      wherein each curved holding element is locked into place by inserting the distal end into the passage until a selected tooth element engages the receiving tooth; and
      wherein the tab of the base includes a flexible portion that releases the curved holding element when flexed.

11. The cable grip holder of claim 10, wherein each curved holder element forms a closed loop in the locked state.

12. The cable grip holder of claim 10, wherein each curved holding element is formed from nylon.

13. The cable grip holder of claim 10, wherein the curved holder elements are positioned adjacent to each other in a single row.

14. The cable grip holder of claim 10, wherein six curved holding elements are mounted together to form a cable grip holder.

15. The cable grip holder of claim 10, wherein flexing the tab moves the receiving tooth away from the curved holding element to release the curved holding element.

16. The cable grip holder of claim 15, wherein flexing the tab away from the curved holding element moves the receiving tooth away from the curved holding element.

17. A method of organizing and terminating a cable to a patch panel assembly, the method comprising:
   providing the patch panel assembly including a cable manager having a tray, a front panel pivotally connected to the cable manager, wherein the front panel is pivotable between a normal position and a rotated position, the front panel including a first plurality of cable termination locations on a rear of the front panel and a second plurality of cable termination locations on a front of the front panel, the tray including a plurality of cable grip holders, each grip holder corresponding with one of the cable termination locations on the rear of the front panel;
   pivoting the front panel from the normal position to the rotated position;
   connecting at least one conductor of the cable to a connector element located at one of the cable termination locations on the rear of the front panel while the front panel is in the rotated position;
   inserting the cable into a holding element of the corresponding cable grip holder while the front panel is in the rotated position, the holding element including a strap having a plurality of teeth;
pivoting the front panel from the rotated position to the normal position while the cable is positioned within the holding element, wherein pivoting the front panel from the normal position to the rotated position comprises:
   depressing buttons located at ends of the cable manager to deflect fingers located at the ends of the cable manager, wherein deflecting the fingers disengages hook members of the fingers from first retainment apertures of the front panel; and
   pivoting the front panel to the rotated position until the hook members snap into second retainment apertures of the front panel; and
   locking the holding element to secure the cable by latching the strap around the cable while the front panel is in the normal position, wherein each strap latches around one cable.

18. The method of claim 17, wherein locking the holding element includes inserting a distal end of the strap into a passage defined through a base of the holding element and engaging one of the teeth of the strap with a receiving tooth at the base.

* * * * *